Aug. 10, 1948.  J. M. WEHNER  2,446,681
ADJUSTABLE SWITCH OPERATOR
Filed Jan. 5, 1945  2 Sheets-Sheet 1

INVENTOR.
JOHN M. WEHNER
BY Richard A. Marsen
ATTORNEY

Aug. 10, 1948.  J. M. WEHNER  2,446,681
ADJUSTABLE SWITCH OPERATOR
Filed Jan. 5, 1945  2 Sheets-Sheet 2
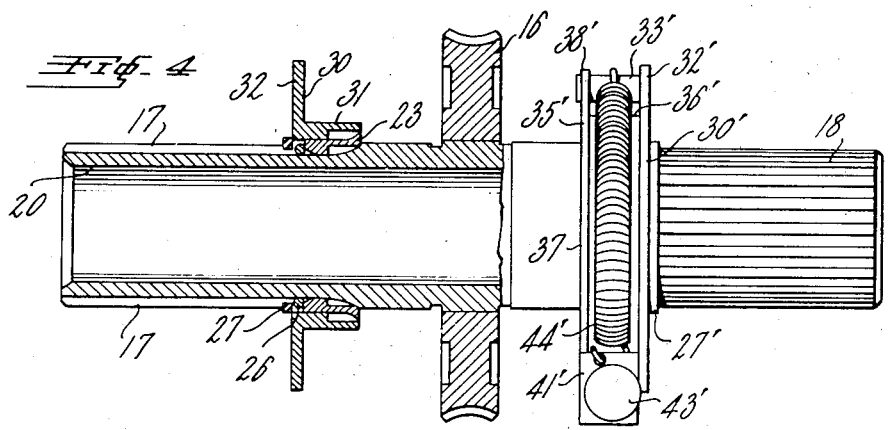
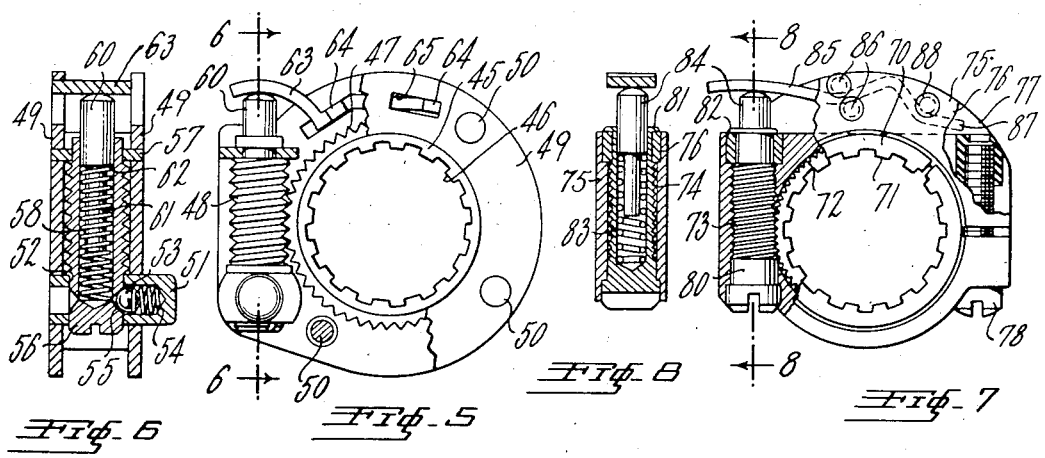
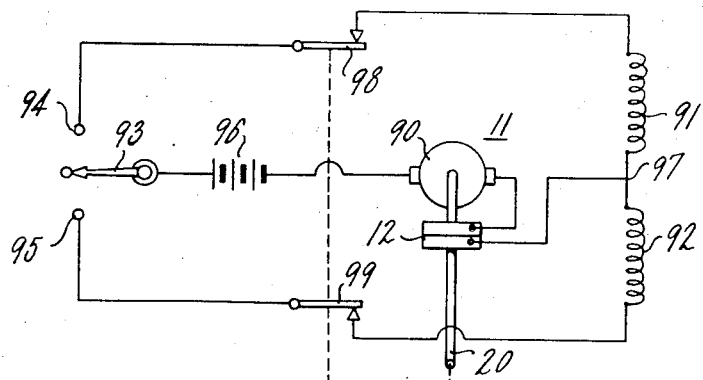
INVENTOR.
JOHN M. WEHNER
BY
ATTORNEY Patented Aug. 10, 1948

2,446,681

UNITED STATES PATENT OFFICE 2,446,681

ADJUSTABLE SWITCH OPERATOR

John M. Wehner, Culver City, Calif., assignor, by mesne assignments, to Lear, Incorporated, Grand Rapids, Mich., a corporation of Illinois Application January 5, 1945, Serial No. 571,508

14 Claims. (Cl. 200—47)

1

This invention relates to switch operating cams and more particularly to a novel adjustable switch operator for actuating a snap action switch.

Cam operated snap action switches have been used for presetting the desired limits of operation of electric motor driven actuating devices, such as commonly used aboard aircraft for operating movable components such as wing flaps, cowl flaps, landing gear, etc. These switches are used to preset the limit of operation of the actuating mechanism in order that the movable component will not jam against its associated control surface and be damaged thereby, and in order to prevent damage to the actuator itself. In order that the limiting positions of the movable component operated by the actuator may be accurately preset, the cams operating the controlling switches for the electric motor must be capable of being accurately and rigidly preset to break the motor circuit at either limit of operation. Cam devices hitherto used either have not been capable of accurate presetting or have been such that the setting may become changed due to vibration or other factors.

It is among the objects of this invention to provide an adjustable switch operator capable of being finely and accurately adjusted to a predetermined position and accurately maintained in that position; to provide an adjustable switch operator comprising a plurality of relatively adjustable parts with means to retain the parts in their preset adjusted relation; to provide an adjustable switch operator with easily accessible means for adjusting the same with respect to the associated switch; to provide a switch operator having shock absorbing means preventing damage to the switch in the event of overrunning of the controlled device beyond its limits; and to provide a simple, inexpensive, efficient, easily adjusted switch operator capable of maintaining its adjusted position irrespective of forces acting to change such adjusted position.

These and other objects, advantages and features of the invention will be apparent from the following description and the accompanying drawings. In the drawings:

Fig. 4 is an elevational view, partly in section, of an actuator shaft provided with a pair of switch operators. The parts in section in this figure are taken on a central axial plane through the shaft 20 of Fig. 2, particularly of the left-hand portion thereof and looking upwardly as viewed in Fig. 2.

Fig. 5 is an elevational view, partly broken away, of a modified form of the invention.

Fig. 6 is a vertical sectional view on the line 6—6 of Fig. 5.

Fig. 7 is an elevational view, partly broken away, of another modified form of the invention.

Fig. 8 is a vertical sectional view on the line 8—8 of Fig. 7.

Fig. 9 is a schematic wiring diagram illustrating an electric circuit arrangement with which the present invention may be used.

Generally speaking, the invention comprises an adjustable switch operator adapted to depress the plunger of a snap action switch controlling the energizing circuit for the electric motor of a motor driven actuator. A switch operating member, such as a tappet or screw is adjustably secured for fine adjustment with respect to supporting elements in turn adjustably mounted upon a rotatable shaft forming part of the actuator. Spring means provide for resilient retraction of the switch operating member to prevent damage to the switch operated thereby in the event of overrunning of the controlled element beyond its limited position. The switch operator preferably includes a plurality of adjustably related elements, with certain of said elements being adapted for relatively rough adjustment with respect to a rotatable shaft and other elements being adapted for relatively fine adjustment with respect to the first mentioned elements.

Figure 1:
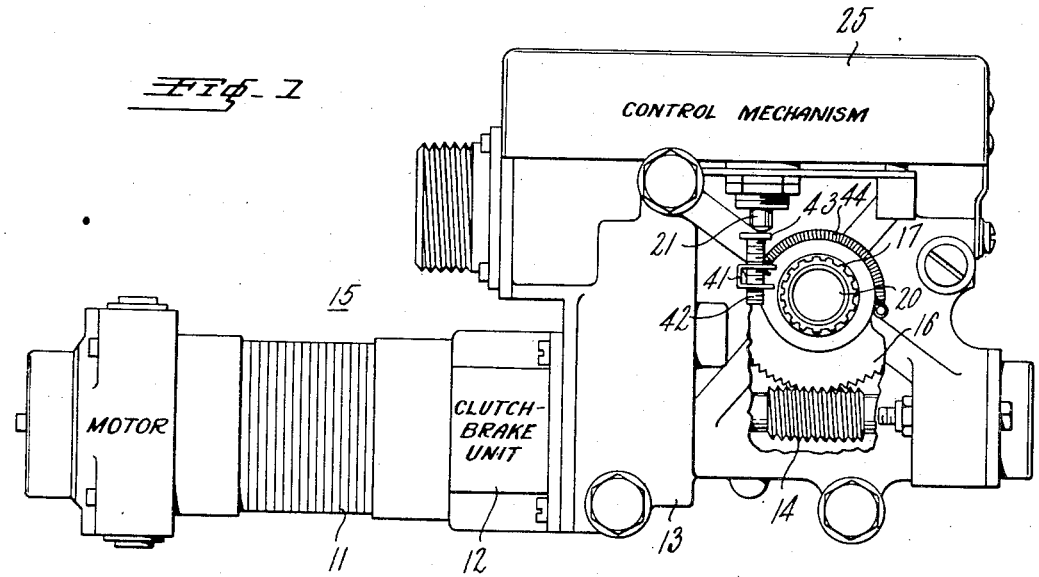
Fig. 1 is a side elevational view, partly broken away, of an electric motor driven actuator incorporating the adjustable switch operator of the invention.
Figure 2:
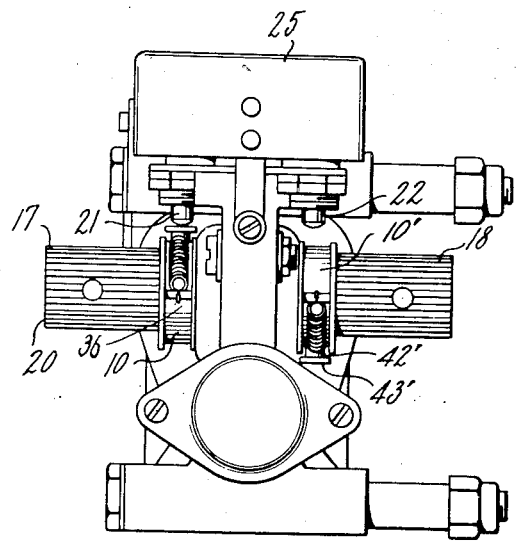
Fig. 2 is a right end view of the actuator shown in Fig. 1.
Figure 3:
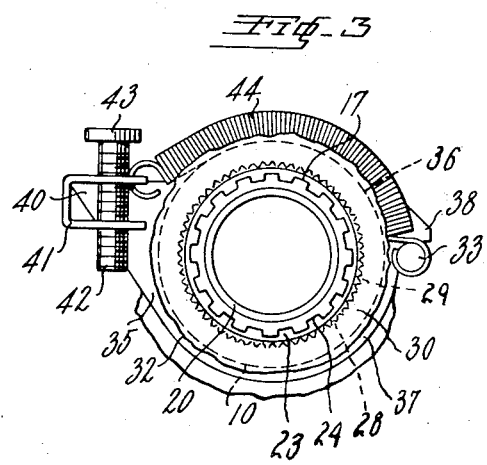
Fig. 3 is an enlarged elevational view, partly broken away, of the adjustable switch operator shown in Figs. 1 and 2.

Referring to Figs. 1 through 4, switch operators 10 and 10' of the invention are illustrated as incorporated in a rotary actuator 15 having an output shaft 20. Snap action switches in a control box 25 are actuated by operators 10, 10' to control the energization of a motor 11 which is connectable, through an electromagnetic clutch-brake unit 12, to reduction gearing contained in housing 13. Electromagnetic clutch-brake unit 12 may be of the type described and claimed in Patent No. 2,267,114, issued December 23, 1941, to William P. Lear for "Electromagnetic clutch." As described in said patent, the clutch-brake unit includes an electromagnetic clutch having an energizing winding preferably connected in electric circuit relation with the motor so that, upon energization of the motor, the motor armature is operatively connected to a driven clutch member on the output side of the clutch-brake unit. Upon deenergization of the motor, biasing means effect a disengagement of the clutch to instantly disconnect the motor from the driven member or element and to effect a braking action upon the clutch driven element to substantially instantly arrest motion thereof and of the driven system connected thereto.

The reduction gearing in housing 13 operates a worm 14 engaged with a worm wheel 16 secured to rotatable shaft 20. Shaft 20, as shown more particularly in Figs. 2 and 4, extends outwardly on either side of actuator 15 and is splined at either end as indicated at 17 and 18 to receive suitable coupling elements whereby the shaft may be connected to driven components adapted to be operated by actuator 15. Switch operators 10, 10' are mounted on either side of worm gear 16 and are arranged to operate a pair of limit switches included in control mechanism 25 for controlling the limit of operation of shaft 20 in either direction of rotation. The switches contained in switch mechanism 25 are preferably snap acting switches of the "micro-switch" type, adapted to control relatively large currents upon the application of relatively small actuating forces to plungers 21 and 22 operatively associated with switch operators 10 and 10' respectively.

As switch operators 10 and 10' are identical in construction and operation, only switch operator 10 will be described in detail. Switch operator 10 includes an adjusting sleeve 23 having inner splines 24 intermeshing with the splines 17 of shaft 20. Sleeve 23 is held in position on shaft 20 by a split ring 26 positioned by snap ring 27 fitting in a circumferential groove formed in shaft 20. The outer surface of sleeve 23 is formed with a plurality of ridges or teeth 28 which are spaced much more closely than are splines 24. An external sleeve 30 is provided having an annular portion 31 and a flange portion 32. The inner surface of annular portion 31 is formed with a plurality of ridges or teeth 29 which interfit with the ridges 28 on adjusting sleeve 23.

The construction described so far gives two shock proof adjustments for switch operator 10 with respect to shaft 20. The first adjustment is accomplished by changing the position of adjusting sleeve 23 with respect to shaft 20 by intermeshing of splines 17 and 24. This is a relatively rough adjustment. Relatively fine adjustment is provided by adjusting sleeve 31 with respect to sleeve 23 through intermeshing of teeth 29 and 28, respectively.

Flange 32 of sleeve 30 is provided with a pin 33 extending axially therefrom. Mounted on annular portion 31 of sleeve 30 is a trip lever 35 having an annular portion 36 fitting over annular portion 31, and a flange portion 37 having projecting ears 38 and 40. Ear 40 integrally supports a bracket 41 receiving a screw or tappet 42 having a head 43 adapted to operatively engage plunger 21 of one of the switches contained in switch mechanism 25. Bracket 41 is likewise provided with an aperture receiving one end of spring 44 extending around annular portion 36 of trip lever 35 and having its other end hooked over pin 33 of sleeve 30. Spring 44 urges trip lever 35 clockwise, as viewed in Fig. 3, to abut ear 38 thereof against pin 33 of sleeve 30.

The operation of the device so far described is as follows. The desired limits of operation of shaft 20 are first determined. Switch operator 10 is then adjusted on shaft 20 in such position that screw 43 thereof will depress plunger 21 to open the associated switch controlling the circuit of motor 11 when shaft 20 has reached one limit of operation. Similarly, switch 10' is adjusted with respect to shaft 20 so that the head 43' of its screw 42' will engage plunger 22 of the associated switch to open the same when shaft 20 reaches its desired limit of operation in the other direction.

To accomplish such adjustment, the following operations are used. Sleeve 23 is secured on splines 17 of shaft 20 by interengagement of splines 17 and 24, and is held in place by snap ring 26. Sleeve 30, with trip lever 35 mounted thereon, is then placed in engagement with adjusting sleeve 23 and held in position by snap ring 27. The position of sleeve 30 and trip lever 35 with respect to adjusting sleeve 23, and thus with respect to shaft 20, may be adjusted by suitable interengagment of teeth 29 and 28 to such position that head 43 of screw 42 will effectively depress plunger 21 at the right instant to break the energizing circuit for motor 11 at one limit of operation of shaft 20. If the motor overruns such limit of operation, spring 44 will be placed under tension, permitting trip lever 35 to move counter clockwise, as viewed in Fig. 3, to relieve the strain from plunger 21 and thereby prevent damage thereto and to its controlled switch.

Fine adjustment of the operation of the switch is obtained by threading screw or tappet 42 along bracket 41. There are thus three adjustments provided. First, sleeve 23 is adjustable on shaft 20. Second, sleeve 30 is adjustable on sleeve 23. Third, tappet or screw 42 is adjustable in bracket 41 of trip lever or operator 35, which is oscillatably mounted on sleeve 30. All of these adjustments are fixed when once made, and are not subject to undesired change due to shock, jarring, or the like, as frequency occurs when purely frictional adjustments are provided.

Switch operator 10' is adjusted in the same manner to control the depression of switch plunger 22 associated therewith. The described device thus gives at least three positions of adjustment for switch operator 10 with respect to shaft 20 so that accurate presetting of the instant of opening of the switches contained in switch mechanism 25 may be made. Additionally, the trip lever mechanism is provided with shock absorbing means so that damage to the switch mechanism is prevented in the event of overrunning of shaft 20 beyond the preset limits of operation.

Figs. 5 and 6 illustrate a modified form of the switch operator. In the illustrated form, a mounting sleeve 45 is provided having inner splines 46 for engagement with the splines 17, 18 of operating shaft 20. On its outer surface, sleeve 46 is provided with worm teeth 47 adapted for intermeshing engagement with the thread of a worm 48. A sleeve member comprising a pair of annular members 49, 49 interconnected by suitable means such as rivets 50 is rotatably mounted upon the outer surface of sleeve 45 on either side of the worm teeth 47 thereof. This outer sleeve member is provided with a mounting 51 for worm 48. This mounting comprises a cup member having an aperture 52 through which the lower end of worm 48 extends. A ball 53 is mounted in cup member 51 and is urged by a spring 54 into engagement with an annular groove 55 near the slotted head 56 of worm 48. The upper end of worm 48 extends through an aperture in a plate 57 joining members 49, 49.

Worm 48 is tubular in form and receives a spring 58 which normally urges a plunger 60 outwardly from the worm. Plunger 60 is provided with a reduced portion 61 forming a shoulder 62 engaging the upper end of spring 59, and is retained against excessive displacement from worm 48 by a leaf spring member 63 having ears 64 extending through apertures 65 in plates 49, 49.

The operation of this embodiment of the invention is as follows. Sleeve member 45 is adjustably positioned on operating shaft 20 by engagement of the splines 46 therewith with the splines 17 of shaft 20. This gives a rough adjustment of the switch operator on the operating shaft. Worm 48 is then rotated, by engagement of a screw driver with the slotted head 56, to adjust plunger 60 with respect to either switch operating plunger 21 or 22. When leaf spring 63, which is adapted to engage plunger 21 or 22, is moved into engagement therewith plunger 60 moves inwardly against the force of spring 59 to prevent damage to the switch operator in the event of overrunning of shaft 20. The described arrangement provides a switch operator having a plurality of adjustments, one being a relatively rough adjustment provided by engaging splines on the operator and the operating shaft, and the other a relatively fine adjustment provided by adjustment of worm 48 with respect to sleeve 45.

Another embodiment of the invention, somewhat similar to that shown in Figs. 5 and 6, is shown in Figs. 7 and 8. In this embodiment of the invention, a split sleeve 70 is provided having splines 71 for engagement with splines 17 or 18 of shaft 20. The split sleeve is provided with worm teeth 72 engaging a worm 73 mounted in a socket 74 formed as part of an outer sleeve 75. Sleeve 75 comprises spaced parallel annular members 76 and 77 integrally united as by being cast as one piece and formed in the shape of a split sleeve. Sleeve 75 is clamped on sleeve 70 by adjustment of a suitable stud 78.

Worm 73 is held in socket 74 by engagement of its slotted head 80 with a shouldered recess in the lower part of the socket and by turning over of the upper end 81 of the worm to engage a collar 82 inserted in the socket. A spring 83 within the worm urges a plunger 84 outwardly into engagement with a leaf spring 85. Leaf spring 85 extends between a pair of pins 86 joining the portions 76, 77 of sleeve 75 and having an end 87 disposed beneath a pin 88 secured in the sleeve 75. The arrangement operates in the same manner as does the arrangement shown in Figs. 5 and 6.

Fig. 9 is a schematic wiring diagram illustrating an electric control circuit with which the switch operator of the invention is particularly adapted to be used. The control circuit includes motor 11, comprising an armature 90 and a pair of reversely wound field windings 91, 92, selectively energized for rotation of the armature 90 in either direction. Armature 90 is connected to operating shaft 20 through electromagnetic clutch 12. The direction of rotation of motor 11 may be controlled by a manual switch 93 adapted to engage either of a pair of contacts 94, 95, to energize motor 11 through field windings 91 or 92 respectively. Switch arm 93 is connected to one terminal of a battery 96 and the other terminal of the battery is connected to one armature terminal. The other armature terminal is connected, through the energizing winding of clutch 12, to the common junction point 97 of field windings 91, 92. The micro switches in control box 25 are represented as single pole, single throw switches 98, 99 each included in circuit with one field winding 91 or 92. When switch 93 is thrown to engage contact 94, motor 11 is energized through field winding 91. When shaft 20 reaches its limit of operation, switch 98 is opened, breaking the circuit through winding 91 and effecting quick stoppage of shaft 20 through the action of clutch-brake unit 12. The operation when switch arm 93 is engaged with contact 95 is similar, except that in this case switch 99 is opened when the motor reaches its limit of operation.

The described invention is relatively simple in construction, yet comprises an effective switch operator capable of rapid and accurate adjustment for operation of snap action switches included in a motor circuit. Both relatively fine and relatively coarse adjustment are provided and means are likewise included for preventing damage to the switch operator or the switch controlled thereby in the event of overruning of the control member such as the shaft 20.

While specific embodiments of the invention have been shown and described to illustrate the application of the principles thereof, it will be understood that the invention may be otherwise embodied without departing from such principles.

What is claimed is:

1. Mechanism for adjustably presetting the limits of rotation of an electric motor driven splined shaft by opening limit switches controlling the energization of the motor comprising, in combination, sleeve means having inwardly extending splines adapted to interfit with the shaft splines for angularly adjustable mounting of said sleeve means on the shaft; a switch operator adjustably mounted on said sleeve means and including a member adapted to actuate the operating element of a limit switch at one limit of operation of the shaft; an abutment carried by said sleeve means; and resilient means normally urging said operator into engagement with said abutment, said resilient means providing for movement of said operator away from said abutment when said member engages such element to prevent damage to the limit switch in the event of overrunning of the rotatable shaft.

2. Mechanism for adjustably presetting the limits of rotation of an electric motor driven shaft by opening limit switches controlling the energization of the motor comprising, in combination, a first element positionable on the shaft and angularly adjustable thereon for relatively coarse adjustment with respect thereto; a second element positionable on said first element and angularly adjustable thereon for relatively fine adjustment with respect thereto; a limit switch operator oscillatably mounted on said second element and adapted to engage the operating plunger of a limit switch; and resilient means normally urging said operator into engagement with an abutment on said second element, said resilient means providing for oscillation of said operator away from the abutment when said operator engages such operating plunger to prevent damage to the limit switch in the event of overrunning of the rotatable shaft.

3. Mechanism for adjustably presetting the limits of rotation of an electric motor driven splined shaft by opening limit switches controlling the energization of the motor comprising, in combination, a first annular element having inwardly extending splines adapted to interfit with the shaft splines for angularly adjustable mounting of said element on the shaft; a second annular element positionable on said first element and angularly adjustable thereon for relatively fine adjustment with respect thereto; a limit switch operator oscillatably mounted on said second element and adapted to engage the operating plunger of a limit switch; and resilient means normally urging said operator into engagement with an abutment on said second element, said resilient means providing for oscillation of said operator away from the abutment when said operator engages such operating plunger to prevent damage to the limit switch in the event of overrunning of the rotatable shaft.

4. Mechanism for adjustably presetting the limits of rotation of an electric motor driven splined shaft by opening limit switches controlling the energization of the motor comprising, in combination, a first sleeve having relatively large splines on its inner surface and relatively small splines on its outer surface, said relatively large splines being adapted to interfit with the shaft splines for angularly adjustable mounting of said first sleeve on the shaft; a second sleeve having splines on its inner surface adapted to interfit with said relatively small splines for angular adjustment of said sleeves; an annular limit switch operator oscillatably mounted on said second sleeve and adapted to engage the operating plunger of a limit switch; an abutment on said second sleeve; and resilient means normally urging said operator into engagement with said abutment, said resilient means providing for oscillation of said operator away from the abutment when said operator engages such operating plunger to prevent damage to the limit switch in the event of overrunning of the rotatable shaft.

5. Mechanism for adjustably presetting the limits of rotation of an electric motor driven splined shaft by opening limit switches controlling the energization of the motor comprising, in combination, a first sleeve having relatively large splines on its inner surface and relatively small splines on its outer surface, said relatively large splines being adapted to interfit with the shaft splines for angularly adjustable mounting of said first sleeve on the shaft; a second sleeve having splines on its inner surface adapted to interfit with said relatively small splines for angular adjustment of said sleeves; an abutment on said second sleeve; a third sleeve oscillatably mounted on said second sleeve and having a stop aligned with said abutment; a tappet adjustably mounted on said third sleeve and adapted to engage the operating plunger of a limit switch; and resilient means normally urging said stop against said abutment, said resilient means providing for movement of said stop away from said abutment when said tappet engages such plunger to prevent damage to the limit switch in the event of overrunning of the rotatable shaft.

6. Mechanism for adjustably presetting the limits of rotation of an electric motor driven splined shaft by opening limit switches controlling the energization of the motor comprising, in combination, a first sleeve having relatively large splines on its inner surface and relatively small splines on its outer surface, said relatively large splines being adapted to interfit with the shaft splines for angularly adjustable mounting of said first sleeve on the shaft; a second sleeve having splines on its inner surface adapted to interfit with said relatively small splines for angular adjustment of said sleeves; an abutment on said second sleeve; a third sleeve oscillatably mounted on said second sleeve, said third sleeve being formed with a bracket and with a stop aligned with said abutment; a tappet threadedly mounted in said bracket for adjustment with respect to said third sleeve and adapted to engage the operating plunger of a limit switch; and resilient means normally urging said stop against said abutment, said resilient means providing for movement of said stop away from said abutment when said tappet engages such plunger to prevent damage to the limit switch in the event of overrunning of the rotatable shaft.

7. Mechanism for adjustably presetting the limits of rotation of an electric motor driven splined shaft by opening limit switches controlling the energization of the motor comprising, in combination, a first sleeve having relatively large splines on its inner surface and relatively small splines on its outer surface, said relatively large splines being adapted to interfit with the shaft splines for angularly adjustable mounting of said first sleeve on the shaft; a second sleeve formed with a tubular portion having splines on its inner surface adapted to interfit with said relatively small splines for angular adjustment of said sleeves, and with a radial flange; a pin extending axially from said flange; a third sleeve oscillatably mounted on said second sleeve and formed with a bracket and with a radial stop adapted to engage said pin; a tappet threadedly mounted in said bracket for adjustment with respect to said third sleeve and adapted to engage the operating plunger of a limit switch; and resilient means normally urging said stop against said pin, said resilient means providing for movement of said stop away from said pin when said tappet engages such plunger to prevent damage to the limit switch in the event of overrunning of the rotatable shaft.

8. Mechanism for adjustably presetting the limits of rotation of an electric motor driven splined shaft by opening limit switches controlling the energization of the motor comprising, in combination, a first sleeve having relatively large splines on its inner surface and relatively small splines on its outer surface, said relatively large splines being adapted to interfit with the shaft splines for angularly adjustable mounting of said first sleeve on the shaft; a second sleeve formed with a tubular portion having splines on its inner surface adapted to interfit with said relatively small splines for angular adjustment of said sleeves, and with a radial flange; a pin extending axially from said flange; a third sleeve oscillatably mounted on said second sleeve and formed with a bracket and with a radial stop adapted to engage said pin; a tappet threadedly mounted in said bracket for adjustment with respect to said third sleeve, and adapted to engage the operating plunger of a limit switch; and a coil spring connecting said bracket and said pin and normally urging said stop against said pin, said coil spring providing for movement of said stop away from said pin when said tappet engages such plunger to prevent damage to the limit switch in the event of overrunning of the rotatable shaft.

9. Mechanism for adjustably presetting the limits of rotation of an electric motor driven splined shaft by opening limit switches controlling the energization of the motor comprising, in combination, a sleeve having internal splines adapted to interfit with the shaft splines for angular adjustment of said sleeve on the shaft and provided with external worm wheel teeth; an annular member oscillatably mounted on said sleeve; a worm rotatably mounted on said member and engaging said teeth for angularly adjusting said member relative to said sleeve; and a switch operator mounted on said member and adapted to actuate the operating element of a limit switch at one limit of operation of the shaft.

10. Mechanism for adjustably presetting the limits of rotation of an electric motor driven splined shaft by opening limit switches controlling the energization of the motor comprising, in combination, a sleeve having internal splines adapted to interfit with the shaft splines for angular adjustment of said sleeve on the shaft and provided with external worm wheel teeth; an annular member oscillatably mounted on said sleeve; a worm rotatably mounted on said member and engaging said teeth for angularly adjusting said member relative to said sleeve; and a switch operator resiliently mounted on said member and adapted to actuate the operating element of a limit switch at one limit of operation of the shaft.

11. Mechanism for adjustably presetting the limits of rotation of an electric motor driven splined shaft by opening limit switches controlling the energization of the motor comprising, in combination, a sleeve having internal splines adapted to interfit with the shaft splines for angular adjustment of said sleeve on the shaft and provided with external worm wheel teeth; an annular member oscillatably mounted on said sleeve; a tubular worm rotatably mounted on said member and engaging said teeth for angularly adjusting said member relative to said sleeve; a switch operator reciprocably mounted in said worm and adapted to actuate the operating element of a limit switch at one limit of operation of the shaft; resilient means urging said operator to project from said worm; and stop means limiting outward movement of said operator.

12. Mechanism for adjustably presetting the limits of rotation of an electric motor driven splined shaft by opening limit switches controlling the energization of the motor comprising, in combination, a sleeve having internal splines adapted to interfit with the shaft splines for angular adjustment of said sleeve on the shaft and provided with external worm wheel teeth; an annular member oscillatably mounted on said sleeve; a tubular worm rotatably mounted on said member and engaging said teeth for angularly adjusting said member relative to said sleeve; a switch operator reciprocably mounted in said worm and adapted to actuate the operating element of a limit switch at one limit of operation of the shaft; resilient means urging said operator to project from said worm; and inwardly flexible stop means limiting outward movement of said operator; said resilient means permitting inward movement of said operator to prevent damage to the switch in the event of overrunning of the shaft.

13. Mechanism for adjustably presetting the limits of rotation of an electric motor driven splined shaft by opening limit switches controlling the energization of the motor comprising, in combination, a sleeve having internal splines adapted to interfit with the shaft splines for angular adjustment of said sleeve on the shaft and provided with external worm wheel teeth; a pair of interconnected, axially spaced annular flanges oscillatably mounted on said sleeve; a tubular worm rotatably mounted between said flanges and engaging said teeth for angularly adjusting said flanges relative to said sleeve; a switch operator reciprocably mounted in said worm and adapted to actuate the operating element of a limit switch at one limit of operation of the shaft; resilient means urging said operator to project from said worm; and an inwardly flexible leaf spring secured to said flanges and limiting outward movement of said operator; said resilient means permitting inward movement of said operator to prevent damage to the switch in the event of overrunning of the shaft.

14. Mechanism for adjustably presetting the limits of rotation of an electric motor driven splined shaft by opening limit switches controlling the energization of the motor comprising, in combination, a sleeve having internal splines adapted to interfit with the shaft splines for angular adjustment of said sleeve on the shaft and provided with external worm wheel teeth; a split annular bracket oscillatably mounted on said sleeve; a tubular worm rotatably mounted in said bracket and engaging said teeth for angularly adjusting said bracket relative to said sleeve; a switch operator reciprocably mounted in said worm and adapted to actuate the operating element of a limit switch at one limit of operation of the shaft; resilient means urging said operator to project from said worm; and an inwardly flexible leaf spring secured to said bracket and limiting outward movement of said operator; said resilient means permitting inward movement of said operator to prevent damage to the switch in the event of overrunning of the shaft.

JOHN M. WEHNER.

REFERENCES CITED

The following references are of record in the file of this patent:

UNITED STATES PATENTS

| Number | Name | Date |
| --- | --- | --- |
| 1,867,453 | Harding | July 12, 1932 |
| 2,328,266 | Durbin | Aug. 31, 1943 |